UNITED STATES PATENT OFFICE.

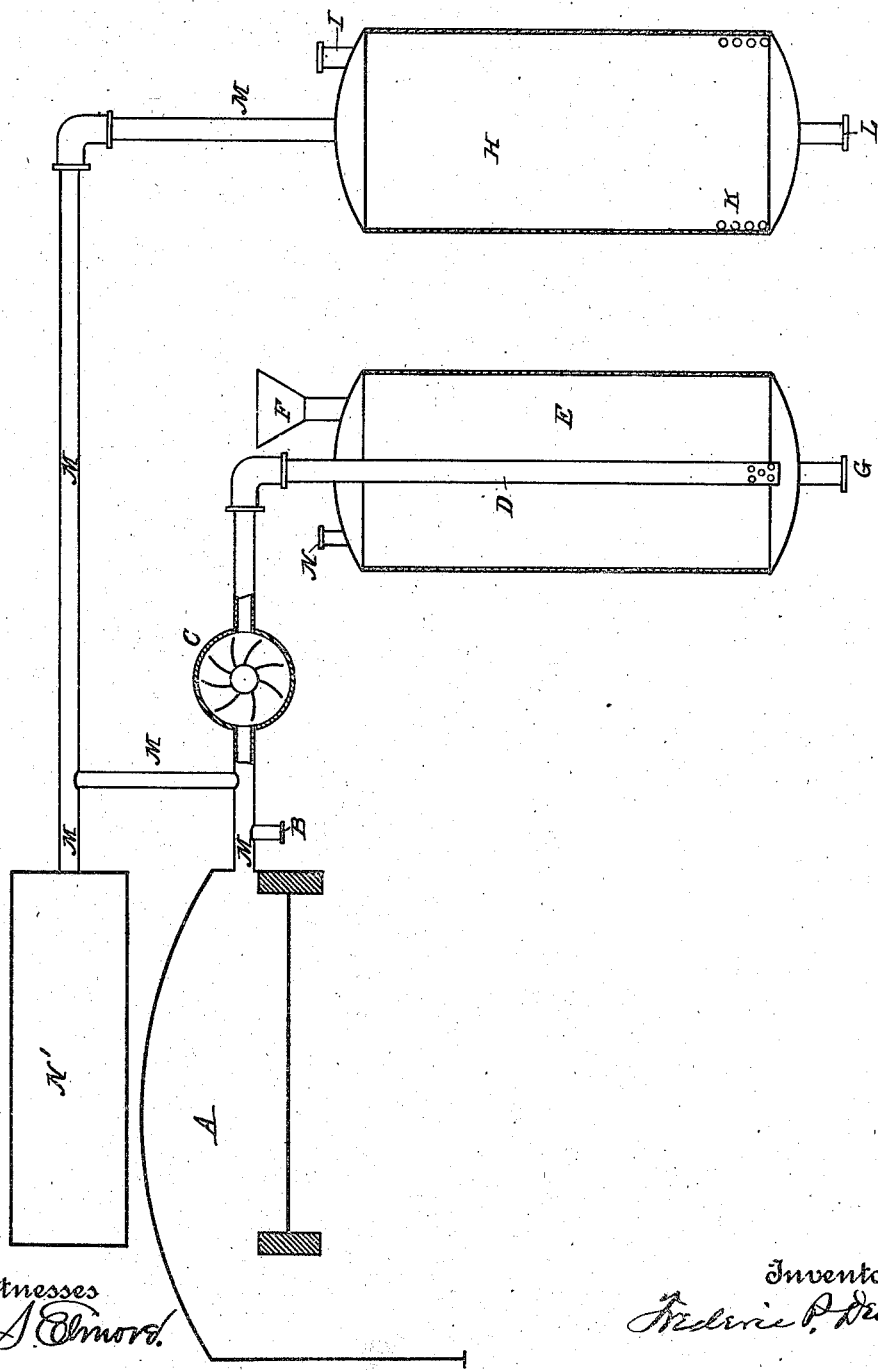

FREDERIC P. DEWEY, OF WASHINGTON, DISTRICT OF COLUMBIA.

TREATING OXID OF ZINC.

No. 900,088.  Specification of Letters Patent.  Patented Oct. 6, 1908.

Application filed June 8, 1898. Serial No. 682,910.

*To all whom it may concern:*

Be it known that I, FREDERIC P. DEWEY, citizen of the United States, residing at Washington, in the District of Columbia, have invented certain new and useful Improvements in Treating Oxid of Zinc; and I do hereby declare the following to be a full, clear, and exact description of the invention, such as will enable others skilled in the art to which it appertains to make and use the same.

My invention relates primarily to the conversion of oxid of zinc into sulfite of zinc, and more particularly to the treatment of the mixture of galena, pyrite and blende carrying a small amount of silver, which is commonly spoken of as "low grade sulfid ore". Enormous quantities of these ores are known to exist in various parts of our mining country, particularly at Leadville, Colorado, which are now practically valueless. They carry from 10 to 20 per cent. lead, 15 to 25 per cent. iron, 20 to 35 per cent. zinc and 10 to 25 ounces silver per ton, together with small amounts of other things. Smelting charges upon ores carrying zinc are very high, and it does not pay to smelt them. Various special processes have been proposed for their treatment, but none of them have been successful so far. Among the processes proposed are several in which the ore is roasted and then treated with the sulfurous acid given off in the roasting, in order to convert the zinc into sulfite, which is dissolved in water, and separated from the residue containing the lead, iron and silver. From a critical quantitative examination of the various sulfite processes I have discovered that they are all very seriously handicapped by the enormous quantities of water that must be handled in order to dissolve the zinc.

It is the special object of my invention to bring the zinc of the roasted ore into solution in a minimum quantity of water, and this I secure by the use of a very large amount of sulfurous acid applied in a particular manner. The very best result that can be obtained by the processes heretofore proposed requires twenty-five tons of water to dissolve one ton of oxid of zinc while some of them require as much as one hundred tons of water to dissolve one ton of oxid of zinc, while by my process I can dissolve one ton of oxid of zinc in less than ten tons of water. In other words while the older processes can not yield a solution carrying more than four per cent. of oxid of zinc my process yields solutions carrying over ten per cent. of oxid of zinc. Incidentally I also recover my zinc in the form of an oxid of zinc suitable for smelting to spelter without the use of any extraneous reagents.

I have discovered that the amount of oxid of zinc held in solution by sulfurous acid water depends upon the amount of sulfurous acid present in excess of the quantity required to convert the oxid of zinc into sulfite, and that the ores under consideration do not yield sufficient sulfurous acid on being roasted to make a concentrated solution, so that, in order to get such concentrated solutions, it is necessary to have more sulfurous acid than the roasting of the ore itself will furnish. I obtain this extra supply of sulfurous acid preferably by the subsequent manipulation of the solution of sulfite of zinc and the decomposition of the zinc sulfite itself so that I use my sulfurous acid over and over again, and thus have an abundant supply of sulfurous acid and a continuous process. Where large quantities of other sulfid ores are being roasted the extra sulfurous acid required may sometimes be obtained from this source. Such concentrated solutions of sulfite of zinc in sulfurous acid water as I obtain will deposit crystals of sulfite of zinc on being deprived of their excess of free sulfurous acid. This may be accomplished by the heating of the solution, or by means of a vacuum, or both these means combined, and by passing the evolved sulfurous acid into a new charge of roasted ore it may be used many times over. The solution deprived of its excess of sulfurous acid gas will still contain some zinc, and, in order not to waste this, the liquid is cooled when necessary, and is then recharged with sulfurous acid and used in treating a fresh lot of ore so as to saturate it again with zinc. I have also discovered that in dissolving oxid of zinc in sulfurous acid water it is much easier to keep the zinc dissolved in a small volume of water than it is to dissolve already formed sulfite of zinc in the same amount of water, so that I prefer to operate in such a way that there is no separation of sulfite of zinc during the dissolving operation, and this I secure by always having an excess of free sulfurous acid present in the solution. This is secured by adding the roasted ore to the sulfurous acid water in small portions at a time. Furthermore I have discovered that, starting with water saturated with sulfurous acid gas, a point is reached when the further addition of roasted ore will produce a precipitation of the already dissolved sulfite of zinc, and it is impossible to obtain a concentrated solution, so that a farther part of my invention consists in supplying sulfurous acid gas to the solution while the zinc is being dissolved. The crystals obtained by depriving the concentrated solution of zinc in sulfurous acid water of its free sulfurous acid consist of sulfite of zinc, and on heating these crystals for a short time to about 1000° C. they are completely decomposed and yield a very pure oxid of zinc which is eminently fitted for spelter smelting. Repeated trials have produced an oxid practically free from sulfur, showing less than 0.01 per cent. of that element. By my process the zinc is removed from the ores, and recovered in a valuable form, while the silver, lead and iron are left in a residue that smelts easily, and yields base bullion.

To more fully set out my invention I will describe it as applied to a particular ore without limiting myself to the details. The ore, carrying 20 ounces silver per ton, 10 per cent. lead, 30 per cent. zinc and 2 per cent. silica, the balance being mainly iron and sulfur, is first roasted, preferably until the iron is converted into sesquioxid. The sulfurous acid given off during the roasting is conveyed to a suitable scrubber where it is absorbed in water. The roasted ore is then placed in a hopper or bin from which it is automatically fed in small portions at a time into a vat or tub containing an aqueous solution of sulfurous acid, preferably the solution obtained by absorbing the sulfurous acid given off in roasting the ore, at the same time more sulfurous acid is conducted into the solution, preferably that obtained in the next step of the process. The feeding of the roasted ore and the introduction of the sulfurous acid gas are so regulated that the free sulfurous acid is always in excess. When a sufficiently strong solution of zinc is obtained the contents of the vat are removed to a filter where the solution is separated from the residue. The residue is suitably washed and smelted for the silver and lead it contains, or it is otherwise utilized. The solution of sulfite of zinc in sulfurous acid water is next transferred to a closed vessel provided with suitable outlets where it is gently heated to drive off the sulfurous acid gas, at the same time a suction pump aids the evolution of gas and drives the evolved gas into a fresh lot of ore in the dissolving vat. When the free sulfurous acid has been sufficiently removed the crystals of sulfite of zinc are separated from the liquid, which goes to the scrubber to be charged with sulfurous acid gas and be used again in the dissolving vat.

The sulfite of zinc is next heated to about 1000° C. in a suitable furnace yielding a very pure oxid of zinc which can be smelted for spelter or otherwise utilized. The sulfurous acid gas given off in this operation can be absorbed in water for use, or sent to the dissolving vat.

In the claims the expression oxidized ores includes both the naturally and artificially oxidized ores.

The drawing is a diagrammatic illustration, partly in section, of the application of the process.

A represents an ordinary reverberatory furnace for the roasting of ores.

C represents a suction fan, which gathers up sulfurous acid from various sources and delivers it, through the pipe D, which is provided with various openings at its terminus, into the vat E. The vat E has an inlet F provided with a hopper and feeding apparatus, not shown, for introducing the roasted ore gradually into the vat E. It has also a discharge G, for the removal of the residue remaining after treating the roasted ore with sulfurous acid together with the solution of sulfite of zinc produced.

N is an outlet for any excess of gas introduced into the vat E.

H represents a vat, in which the solution of sulfite of zinc is heated by the steam coil K in order to drive off sulfurous acid. It is provided with an inlet I for introducing the solution, an outlet L for withdrawing the precipitated sulfite of zinc, and an outlet M for the removal of the sulfurous acid liberated by the heat.

N″ represents a closed retort, suitably placed within a heating furnace, not shown, in which the sulfite of zinc is heated, in order to decompose it, with the evolution of sulfurous acid, which is withdrawn from the retort by the pipe M.

M M represent a series of gas ways, provided with suitable valves, not shown, which serve to conduct the sulfurous acid developed at various stages in the process to the suction fan C.

B represents a flue provided with a damper, not shown, for conveying the roasting gases to the chimney when these gases are not required in the operation of the process.

As previously pointed out it is essential to the successful extraction of zinc from its ores by the use of sulfurous acid that when the sulfite of zinc is formed there should be sufficient extra sulfurous acid present in the solution beyond the amount required to form the sulfite of zinc in order to retain the sulfite of zinc in the solution, for the reason that it is so difficult to redissolve the crystals of sulfite of zinc once they are formed. This explains why all sulfurous acid leaching processes are so inefficient on zinc ores, for, in the early stages of the leaching, the sulfurous acid of the leach liquor is gradually neutralized by the zinc and sulfite of zinc is precipitated back into the ore so that finally the first leach solution running from the charge is practically free from zinc and a very large amount of solution is required subsequently to re-dissolve the precipitated sulfite of zinc out of the ore. The actual amount of this extra sulfurous acid required varies in different cases. It depends upon the amount of zinc dissolved and increases with the amount of zinc held in solution. In the claims this extra sulfurous acid required to hold the zinc sulfite in solution is called an excess and it means that there must be a sufficient excess of free sulfurous acid in the solution to retain the zinc in solution according to the amount of sulfite of zinc formed.

What I claim as new and valuable is:—

1. The process of dissolving oxid of zinc, which consists in adding it in small portions at a time to water containing sulfurous acid so that the free sulfurous acid remains always in excess, substantially as described.

2. The process of dissolving oxid of zinc, which consists in adding it to water containing sulfurous acid, and simultaneously supplying sulfurous acid to the solution so that the free sulfurous acid is always in excess, substantially as described.

3. The process of separating oxid of zinc from oxids insoluble in sulfurous acid water, which consists in adding the mixed oxids to water containing sulfurous acid, simultaneously supplying sulfurous acid to the solution so that the free sulfurous acid is always in excess, and separating the solution from the residue, substantially as described.

4. The process of treating sulfids containing zinc, which consists in subjecting the sulfids to an oxidizing roast and gradually introducing the roasted ore into water containing sulfurous acid so that the free sulfurous acid remains always in excess, substantially as described.

5. The process of treating sulfids containing zinc, which consists in subjecting the sulfids to an oxidizing roast, gradually introducing the roasted ore into water containing sulfurous acid, and at the same time supplying fresh sulfurous acid to the solution so that the free sulfurous acid is always in excess, substantially as described.

6. The process of treating sulfids containing zinc, which consists in subjecting the sulfids to an oxidizing roast, gradually introducing the roasted ore into water containing sulfurous acid, and at the same time supplying fresh sulfurous acid to the solution so that the free sulfurous acid is always in excess, and separating the solution from the residue, substantially as described.

7. The process of treating mixed sulfids of zinc, lead and iron, which consists in subjecting the sulfids to an oxidizing roast, gradually introducing the roasted ore into water containing sulfurous acid, and at the same time supplying fresh sulfurous acid to the solution, substantially as described.

8. The process of treating mixed sulfids of zinc, lead and iron, which consists in subjecting the sulfids to an oxidizing roast, gradually introducing the roasted ore into water containing sulfurous acid, and at the same time supplying fresh sulfurous acid to the solution, and separating the solution from the insoluble residue, substantially as described.

9. The process of treating mixed sulfids of zinc, lead and iron, which consists in subjecting the sulfids to an oxidizing roast, gradually introducing the roasted ore into water containing sulfurous acid, and at the same time supplying fresh sulfurous acid to the solution, separating the solution from the insoluble residue and recovering the zinc sulfite from the solution by heating, substantially as described.

10. The process of treating mixed sulfids of zinc, lead and iron containing silver, which consists in subjecting the sulfids to an oxidizing roast, gradually introducing the roasted ore into water containing sulfurous acid, and at the same time supplying fresh sulfurous acid to the solution, separating the solution from the insoluble residue, and smelting the residue to extract the silver and lead, substantially as described.

11. The process of treating mixed sulfids of zinc, lead and iron containing silver, which consists in subjecting the sulfids to an oxidizing roast, gradually introducing the roasted ore into water containing sulfurous acid, and at the same time supplying fresh sulfurous acid to the solution, separating the solution from the insoluble residue, recovering the zinc sufite from the solution and smelting the residue to extract the silver and lead, substantially as described.

12. In the treatment of ores the process which consists in subjecting the oxidized ores to the action of an aqueous solution of sulfurous acid containing an excess of free sulfurous acid, separating the solution of sulfite thus formed from the balance of the ore, driving off the excess of free sulfurous acid and reabsorbing it in water in the treatment of a fresh charge of ore; substantially as described.

13. In the treatment of ores the process which consists in subjecting the oxidized ores to the action of an aqueous solution of sulfurous acid containing an excess of free sulfurous acid, separating the solution of sulfite thus formed from the balance of the ore, driving off the excess of free sulfurous acid and precipitating the dissolved sulfite, separating the precipitated sulfite from the liquid, heating the separated sulfite and reabsorbing the sulfurous acid thereby developed in water in the treatment of a fresh charge of ore; substantially as described.

14. In the treatment of ores the continuous process which consists in subjecting the oxidized ores to the action of an aqueous solution of sulfurous acid containing an excess of free sulfurous acid, separating the solution of sulfite thus formed from the balance of the ore, driving off the excess of free sulfurous acid and precipitating the dissolved sulfite, separating the precipitated sulfite from the liquid and recharging the liquid with sulfurous acid in the treatment of a fresh charge of ore; substantially as described.

15. In the treatment of mixed sulfids of zinc, lead and iron, the process, which consists in subjecting the sulfids to an oxidizing roast, converting the oxid of zinc thus formed into sulfite of zinc by combining it with sulfurous acid, separating the sulfite of zinc from the balance of the ore, decomposing the sulfite of zinc and reabsorbing the sulfurous acid thereby developed in water in the treatment of a fresh lot of roasted sulfids; substantially as described.

16. In the treatment of mixed sulfids of zinc, lead and iron, the process, which consists in subjecting the sulfids to an oxidizing roast, adding the oxidized ore to an aqueous solution of sulfurous acid containing an excess of free sulfurous acid, separating the solution of sulfite of zinc thus formed from the balance of the ore, driving off the excess of free sulfurous acid from the solution and reabsorbing the sulfurous acid driven off in water in the treatment of a fresh lot of roasted sulfids; substantially as described.

17. In the treatment of mixed sulfids of zinc, lead and iron, the continuous process, which consists in subjecting the sulfids to an oxidizing roast, adding the oxidized ore to an aqueous solution of sulfurous acid containing an excess of free sulfurous acid, separating the solution of sulfite of zinc thus formed from the balance of the ore, driving off the excess of free sulfurous acid from the solution and precipitating the dissolved sulfite of zinc, separating the precipitated sulfite of zinc from the liquid and recharging the liquid with sulfurous acid in the treatment of a fresh charge of ore; substantially as described.

18. In the extraction of zinc from its oxidized ores the step which consists in driving sulfurous acid into a charge of ore and solution and thereby agitating the ore in the solution substantially as described.

In witness whereof, I have hereunto set my hand in the presence of two witnesses.

FREDERIC P. DEWEY.

Witnesses:
  HORACE A. DODGE,
  JULIA M. POND.